United States Patent [19]

Walsh

[11] Patent Number: 4,985,899

[45] Date of Patent: Jan. 15, 1991

[54] INTERCEPT DETECTOR FOR SPREAD-SPECTRUM SIGNALS

[75] Inventor: John B. Walsh, Wichita, Kans.

[73] Assignee: The Boeing Company, Seattle, Wash.

[21] Appl. No.: 417,310

[22] Filed: Oct. 5, 1989

[51] Int. Cl.$^5$ .............................................. H04L 9/00
[52] U.S. Cl. ................................................. 375/1
[58] Field of Search .................................... 375/1

[56] References Cited

U.S. PATENT DOCUMENTS

| | | | |
|---|---|---|---|
| 3,215,934 | 11/1965 | Sallen | 324/77 |
| 3,587,097 | 6/1971 | Stull, Jr. | 343/7 A |
| 4,122,393 | 10/1978 | Gordy et al. | 325/324 |
| 4,189,677 | 2/1980 | Cooper et al. | 375/1 |
| 4,222,115 | 9/1980 | Cooper et al. | 375/1 |
| 4,247,939 | 1/1981 | Stromswold et al. | 373/1 |
| 4,271,524 | 6/1981 | Goodman et al. | 375/1 |
| 4,357,610 | 11/1982 | Kingston et al. | 343/12 A |
| 4,435,821 | 3/1984 | Ito et al. | 375/1 |
| 4,545,061 | 10/1985 | Hilman | 375/1 |
| 4,553,101 | 11/1985 | Mathis | 375/1 |
| 4,621,365 | 11/1986 | Chiu | 375/1 |
| 4,905,221 | 2/1990 | Ichiyoshi | 375/1 |

Primary Examiner—Salvatore Cangialosi
Attorney, Agent, or Firm—Finnegan, Henderson, Farabow, Garrett & Dunner

[57] ABSTRACT

A device for intercepting and decoding spread-spectrum frequency-hopped signals. A bank of frequency domain filters contains a filter for each expected bandwidth in the frequency-hopped signal. Each detector of a bank of detectors detects a pulse and noise in the bandwidth of the pulse from a corresponding filter. A bank of thresholding devices differentiates a pulse from the surrounding noise in accordance with a power level threshold value. The device achieves an improvement of approximately the square root of n, where n is the number of frequency domain filters in the apparatus.

5 Claims, 2 Drawing Sheets

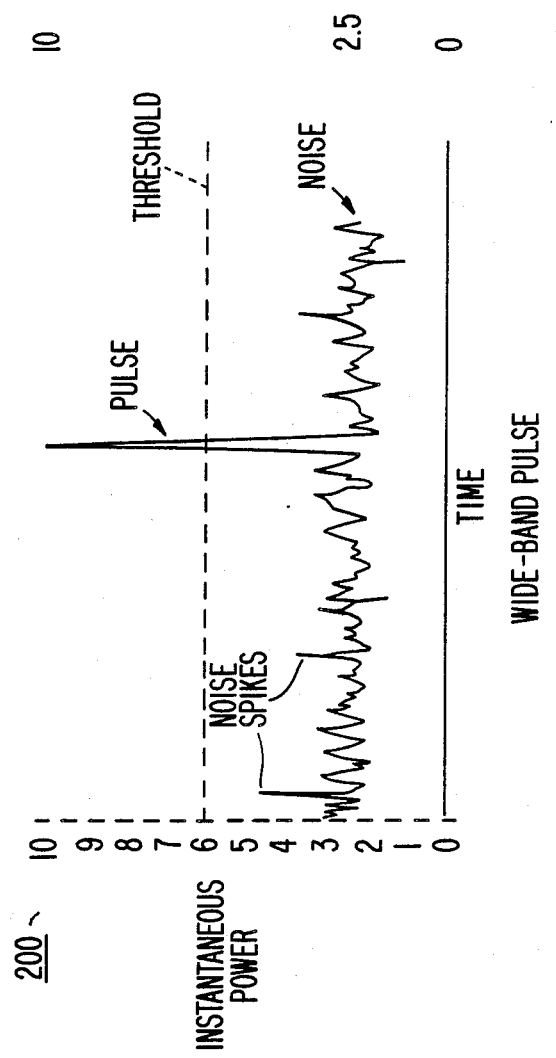

INTERCEPT DETECTOR FOR SPREAD-SPECTRUM SIGNALS

BACKGROUND

The present invention relates to the field of data transmission and reception and, in particular, to the interception of spread-spectrum data transmissions.

Spectrum spreading is a technique used to make it difficult to intercept a transmitted signal from a radar transmitter or the like at a distance The spread-spectrum technique involves coding the transmitted signal so the bandwidth of the signal is many times greater than the bandwidth of the information transmitted. Thus, the spectral density of the signal energy is much less than it was before coding and an unauthorized receiver at a distance will be presented with a signal immersed in background noise. An authorized receiver, on the other hand, applies a decoding algorithm to the received noisy signal and compresses the transmitted information back into its original bandwidth, where it will stand out from the noise.

One standard method of coding a signal consisting of a series of pulses is the method of frequency hopping. This method involves changing a center frequency of each pulse in a prearranged pattern, so that the total bandwidth occupied by the pulse train is very large (or, conversely, so that a particular portion of the band is occupied by a pulse very infrequently). Frequency hopping is relatively simple to implement, and yields results generally considered to be approximately equivalent to more complex methods of spectrum spreading. In a frequency-hopped signal, the frequency spectrum of a single pulse "fills" a portion of the frequency domain with a (sin x)/x distribution. A series of these distributions side-by-side provides a spectrum that is more-or-less uniform.

The detection of a signal by a receiver depends on the relative energy of the received signal and the competing noise. The signal energy depends on the strength of the transmitted signal, the distance R between the transmitter and the receiver, and the gains of the transmitting and receiving antennas. The noise energy depends on the internal noise of the receiver, natural noise sources, e.g., galactic noise, and man-made noise sources, e.g., jammers.

The ideal detector is called a "matched filter." A matched filter concentrates the energy of the received signal (the group of hopped pulses) into a single pulse while passing through as little noise as possible. The output of the detector is a pulse embedded in a stream of noise. The strength of the pulse relative to the noise is characterized by the ratio:

$$S = E/N,$$

where S is a constant value for each predetermined distance of the receiver from the transmitter, E is the energy of the set of hopped pulses expressed in joules, and N is the "noise power density" or power per unit bandwidth of the noise expressed in watts per cycle per second (joules).

A conventional wideband receiver searching for set of hopped pulses does not act as a matched filter. If the transmitted pulses are hopped over a bandwidth that is x times the bandwidth of a single pulse, x times as much noise is introduced. Thus the receiver must approach quite close to the transmitter before a point is reached where an individual pulse is strong enough that it will stand out from the noise, i.e., $S = E/N$ will be large enough to provide an adequate probability of signal detection with an acceptably small false alarm rate.

Thus, because frequency hopped signals appear to have the same spectral characteristics as general spread-spectrum signals to sufficiently distant transmitters, they are difficult to intercept and decode without knowledge of the frequency hopping scheme.

It would be advantageous to be able to intercept such frequency hopping signals by a receiver that does not possess the frequency hopping scheme at distances where the hopped signal is at least partially immersed in noise.

SUMMARY OF THE INVENTION

It is an object of the present invention to be able to intercept and decode frequency-hopped spread-spectrum signals that are immersed in noise, without knowledge of the hopping pattern.

It is an additional object of the present invention to increase the detection range of a spread-spectrum signal detecting apparatus by approximately the square root of n, where n is the number of frequency domain filters in the apparatus.

Additional advantages of the present invention will be set forth in part in the description which follows and in part will be obvious from that description or may be learned by practice of the invention. The advantages of this invention may be realized and obtained by the methods and apparatus particularly pointed out in the appended claims.

The present invention obtains the advantages listed above by dividing the bandwidth of a received signal into sub-bands and by combining only those sub-bands that exceed a predetermined threshold value to obtain an originally transmitted pulse train.

More specifically, to achieve the objects and in accordance with the purpose of the invention, as embodied and broadly described herein, the invention involves an apparatus for decoding a spread-spectrum frequency hopped signal, the signal comprised of pulses in a plurality of different bands. The apparatus comprises means for receiving the frequency hopped signal; means, coupled to the receiving means, for filtering a pulse in each of the plurality of different bands and for filtering the corresponding background noise in each of the plurality of different bands; means, coupled to the filtering means, for detecting the filtered pulses and the corresponding background noise of each pulse; thresholding means, coupled to the detecting means, for differentiating the filtered pulses from the background noise, each differentiated pulse having a power level greater than a threshold power level corresponding to the bandwidth of the pulse; and means, coupled to the thresholding means, for summing the differentiated pulses to produce a decoded signal.

The accompanying drawings, which are incorporated in and which constitute a part of this specification, illustrate one embodiment of the invention and, together with the description, explain the principles of the invention.

BRIEF DESCRIPTION OF THE DRAWINGS

FIG. 2 is a chart of a wide band pulse, such as is intercepted by the present invention.

DESCRIPTION OF THE PREFERRED EMBODIMENTS

Figure 1:
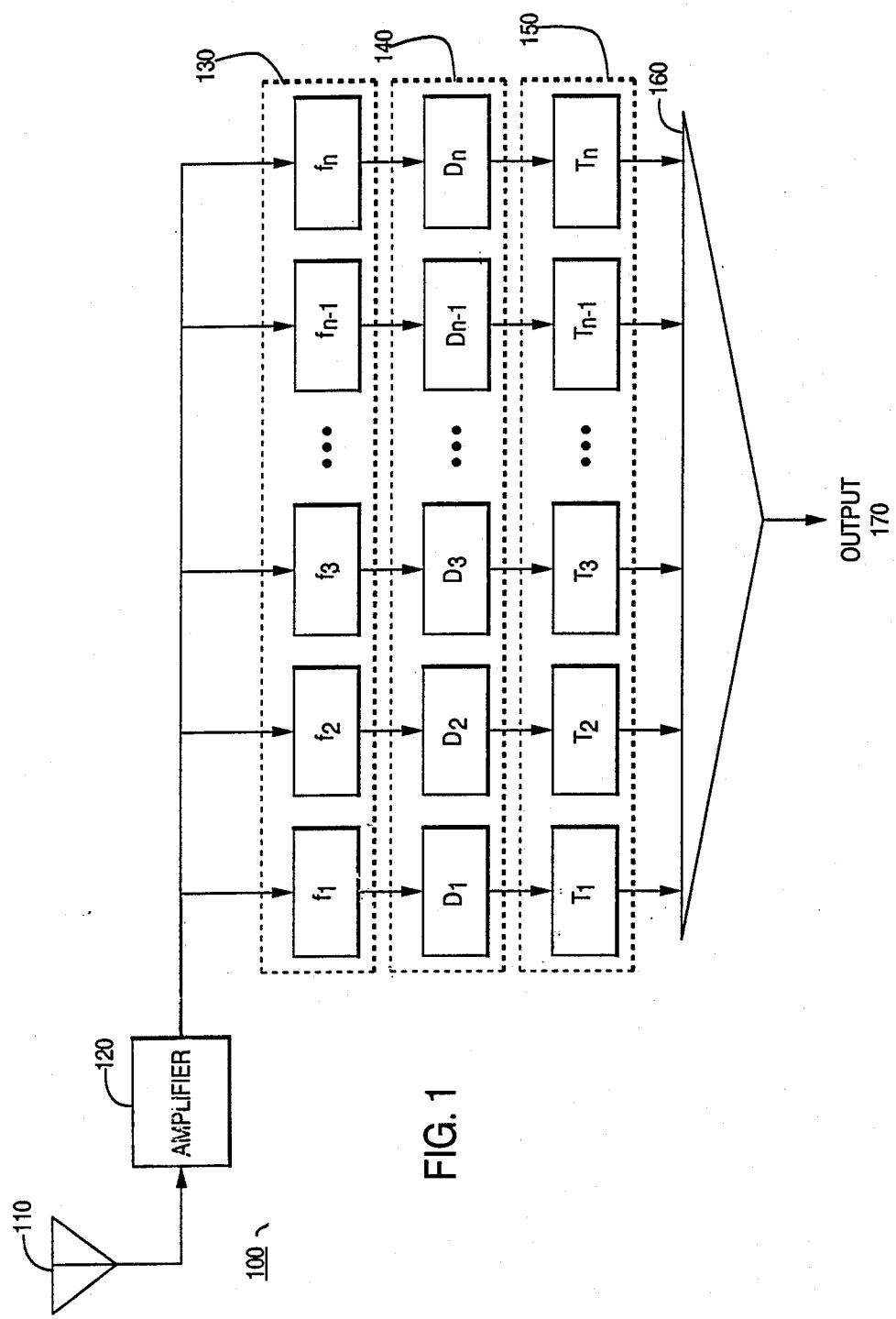
FIG. 1 is a block diagram of a spread-spectrum signal intercepting apparatus according to a first embodiment of the present invention.

Reference will now be made in detail to a presently preferred embodiment of the invention, examples of which are illustrated in the accompanying drawings.

FIG. 1 is a block diagram of a first preferred embodiment of a spread-spectrum signal intercepting apparatus 100 according to the present invention, comprising an antenna 110, an amplifier 120, a filter bank 130, a plurality of detectors 140, a plurality of threshold devices 150, and a summing circuit 160.

Filter bank 130 includes frequency domain filters $F_1$, $F_2$, $F_3$, ..., $F_n$. The bandwidth recognized by each filter matches the bandwidth of an expected pulse of the received signal. Thus, each filter passes a pulse of perhaps a different bandwidth. Plurality of detectors 140 includes detectors $D_1$, $D_2$, $D_3$, ..., $D_n$, the inputs of which are coupled to the outputs of corresponding ones of the filters of filter bank 130. Plurality of threshold devices 150 includes threshold devices $T_1$, $T_2$, $T_3$, ..., $T_n$, the inputs of which are coupled to the outputs of corresponding ones of the detectors of plurality of detectors 140. The output of each threshold device $T_1$, $T_2$, $T_3$, ..., $T_n$ is coupled to summing circuitry 160, which outputs decoded data 170.

The present invention is based on the fact that frequency hopping does not spread the spectrum optimally. Each segment of spectrum containing a pulse does not present a signal of random noise (or even pseudo random noise), but consists of organized components, which together comprise a pulse. The nonlinear process of detection and thresholding reconstruct and identify the pulses. However, the threshold level must be set high enough to keep the occurrences of random threshold crossing small, as discussed below.

As shown in FIG. 1, a received frequency hopped signal is received by antenna 110 and amplified by amplifier 120. The amplified signal is then input to filters $F_1$, $F_2$, $F_3$, ..., $F_n$ simultaneously. If the band of the amplified signal matches the band of one of filters $F_1$, $F_2$, $F_3$, ..., $F_n$, then that filter will output a pulse and the noise received in the filtered bandwidth to a corresponding one of detectors $D_1$, $D_2$, $D_3$, ..., $D_n$. The detector detecting a pulse surrounded by noise then outputs the pulse and noise to a corresponding one of threshold devices $T_1$, $T_2$, $T_3$, ..., $T_n$. Thus, filters 130 and detectors 140 together act as a matched filter to individual pulses in device 100, i.e., only the noise of a matched filter's bandwidth competes with the signal pulse.

The ratio $S = E/N$ is n times better in each filter than in a conventional wide-band receiver, where n is the number of filters in the apparatus. Accordingly, an acceptable ratio $E/N$ can be retained by moving the receiver farther from the transmitter than a conventional receiver so that the received signal energy is reduced by a factor of n. Since signal energy density diminishes as the square of the distance R from the transmitter, increasing R by the ratio of the square root of n will diminish received pulse energy by a factor of n. In this case, pulses will be detected almost as effectively at the increased distance as by a conventional receiver. Because n is preferably on the order of 100 or more, the effective range of device 100 will increase by a factor of 10 or more compared to conventional receivers.

Each of threshold devices $T_1$, $T_2$, $T_3$, ..., $T_n$ of FIG. 1 has the same predetermined power level threshold value unless the anticipated pulses are of different lengths. In such a case, differing power level threshold valves would be used. Any input to the threshold device that exceeds the predetermined power level threshold value is output to summing circuitry 160, where the outputs of threshold devices $T_1$, $T_2$, $T_3$, ..., $T_n$ are combined to form the originally transmitted signal. Thus, over time, summing circuitry 160 outputs the originally transmitted signal.

FIG. 2 is a chart 200 showing instantaneous power as a function of time for a wide band pulse output from one of detectors $D_1$, $D_2$, $D_3$, ..., $D_n$. In chart 200, $S = E/N = 4$. A dotted line in FIG. 2 shows a representative power level threshold value of 6 units for a threshold device receiving input from a corresponding one of detectors $D_1$, $D_2$, $D_3$, ..., $D_n$ detecting pulses.

The thresholding process of threshold devices $T_1$, $T_2$, $T_3$, ..., $T_n$ can have three outcomes: a correct assessment of the presence or absence of a pulse, a failure to detect an existing pulse that is too weak (undetected pulse), or an assessment that there is a pulse when there is not (false alarm). Low threshold values lead to few undetected pulses, but many false alarms. Conversely, high threshold values reduce false alarms but may miss pulses. In a present preferred embodiment of the invention, power level threshold values are chosen which detect half or more of the real pulses and which detect only one false alarm per million opportunities. In other embodiments, other values could be chosen. Thus, for example, when more than one million pulses are detected per second, approximately one false alarm per second results.

Because, by definition, the hopping format of the received signal is not known, a certain amount of inefficiency is inherent in the described apparatus, and the full benefit of the square root of the pulse of filters will not be realized in practice. In addition, because device 100 has n times as many filters as a conventional receiver, device 100 will have n times as many false alarms for equal threshold settings as a conventional receiver. Thus, the power level threshold values of device 100 are increased slightly to reduce the false alarm rate for each band by a factor of n. In addition, to maintain the same probability of detection at these higher thresholds, a higher value of E will be needed. Typically, however, E would have to increase by less than fifty percent. Thus, the theoretical improvement by a factor of the square root of n over conventional receivers may be reduced in practice by up to twenty percent.

Other embodiments will be apparent to those skilled in the art from consideration of the specification and practice of the invention disclosed herein. It is intended that the specification and examples be considered as exemplary only, with a true scope of the invention being indicated by the following claims.

What is claimed is:

1. An apparatus for decoding a spread-spectrum frequency hopped signal having pulses in a plurality of different bands, the apparatus comprising:
   means for receiving the frequency hopped signal;
   means, coupled to the receiving means, for filtering a pulse in each of the plurality of different bands and for filtering the corresponding background noise in each of the plurality of different bands;

means, coupled to the filtering means, for detecting the filtered pulses and the corresponding background noise of each pulse;

thresholding means, coupled to the detecting means, for differentiating the filtered pulses from the background noise, each differentiated pulse having a power level greater than a threshold power level corresponding to the bandwidth of the pulse; and means, coupled to the thresholding means, for summing the differentiated pulses to produce a decoded signal.

2. The apparatus of claim 1, wherein the receiving means includes:

an antenna; and an amplifier.

3. The apparatus of claim 1, wherein the filtering means further includes:

a plurality of filters, each of the plurality of filters for filtering a different one of the plurality of bands; and a plurality of detectors, coupled to corresponding ones of the plurality of filters, each of the plurality of detectors detecting an output of a corresponding one of the plurality of filters.

4. The apparatus of claim 3, wherein the thresholding means includes a plurality of threshold devices, each of the threshold devices connected to a corresponding one of the plurality of detectors and having a power level threshold value corresponding to the bandwidth detected by a corresponding one of the plurality of filters.

5. An apparatus for decoding a spread-spectrum frequency hopped signal having pulses in a plurality of different bands, the apparatus comprising:

means for receiving the frequency hopped signal;

a bank of filters, each filter filtering a signal pulse and corresponding background noise in one of the plurality of different bands;

a bank of detectors, each detector coupled to one corresponding filter in the bank of filters, for detecting a filtered pulse and its corresponding background noise;

a bank of threshold devices, each threshold device coupled to one corresponding detector in the bank of detectors and having a power level threshold value corresponding to the bandwidth of one of the plurality of bands, for differentiating the detected signal pulse from its corresponding background noise; and a summing circuit, coupled to the bank of threshold devices, for summing the differentiated signals to create a decoded output signal.

* * * * *